Jan. 20, 1931. G. A. HOLMES 1,789,310
FASTENER
Filed Oct. 9, 1928
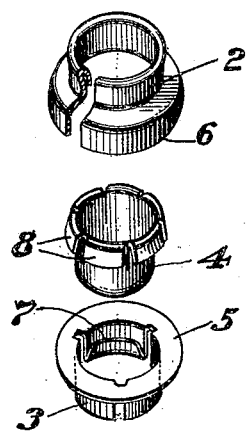
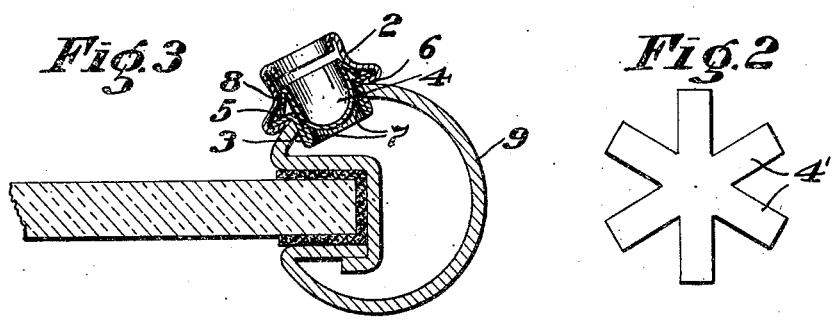
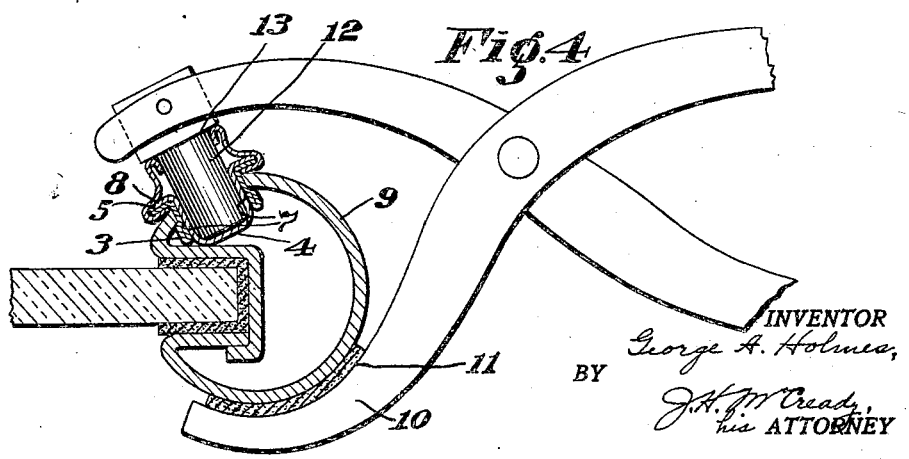
INVENTOR
George A. Holmes,
BY
J. H. McCready,
his ATTORNEY Patented Jan. 20, 1931

1,789,310

UNITED STATES PATENT OFFICE

GEORGE A. HOLMES, OF NEWTON, MASSACHUSETTS, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

FASTENER

Application filed October 9, 1928. Serial No. 311,397.

This invention relates to fasteners and more especially to fasteners of the snap variety.

Fasteners of this type usually include a stud and a socket, the socket having resilient members for yieldingly gripping the head of the stud. In setting the studs in the work it is usual to insert the shank of the stud through the surface to which it is to be secured and then to upset or expand the end of the shank so as to fasten it securely to the work. This procedure requires the use of some kind of an expanding tool on the inner or rear face of the fastener, and if it is impossible to obtain access to said face it is then necessary to use some other method of securing the fasteners. The method commonly employed is to screw the shank of the stud into a tapped hole, but this method obviously cannot be used unless there is a considerable thickness of stock to take the threads.

The present invention is especially concerned with the mounting of fasteners in the work where it is impossible to obtain access to the inner or rearward end of the fastener, and where a screw threaded shank cannot be used. It is the chief object of the invention to devise a fastener which can be anchored in the work by operating from the outer end of the fastener, preferably by expanding the fastener from within.

The nature of the invention will be readily understood from the following description when read in connection with the accompanying drawings, and the novel features will be particularly pointed out in the appended claims.

In the drawings,

Figure 1 is a perspective view of the component parts of a fastener stud embodying this invention;

Fig. 2 is a plan view of a blank from which one of the parts of the fastener may conveniently be made;

Fig. 3 is a sectional view showing the completed fastener set into an article of work but prior to being secured permanently therein; and Fig. 4 is a similar view showing the fastener after it has been securely anchored in the work.

Referring to Figs. 1 and 3 it will be seen that the fastener shown comprises a head 2, a shank 3, and a thimble 4. The shank has a flange 5 at its upper end which is positioned in the enlarged lower portion of the head 2, and the lower margin 6 of this part of the fastener is turned inwardly, as shown in Fig. 3, the edge of the flange 5 being pinched between the flange 6 and the main body of the head. Preferably the shank 3 is split into several sections so that it can be expanded readily, and the lower end portion 7 of each section is folded upwardly upon itself, as clearly shown in the drawings.

The thimble 4 may conveniently be made from a blank such as that shown at 4', Fig. 2, this blank being pressed in suitable dies to bring it into substantially the shape shown in Fig. 1. It will be observed that the main body of the thimble is cup-shaped and that its upper portion is split and is provided with several backwardly bent fingers 8.

In assembling the fastener the thimble 8 is inserted in the shank 5, the body portion of the thimble extending down into the shank while the ends of the fingers 8 rest on the flange 5. These parts are then inserted in the lower portion of the head 2 and the flange 6 of the head is then bent or crimped inwardly. The completed fastener is shown in Fig. 3.

Figs. 3 and 4 show the fastener applied to a wind shield frame 9 of an automobile. The setting of the fastener in such a frame is facilitated by the use of a tool like that shown in Fig. 4. This tool is similar to a pair of pliers and is provided with a jaw 10 carrying a pad 11 of leather, felt, or the like, to engage the face of the wind shield frame opposite to that in which the fastener is set. The opposite jaw has a plunger 12 pivotally mounted in it, this plunger being of suitable shape and dimensions to enter the fastener, it being observed that since both the head 2 and shank 3 are of tubular form, the outer end of the fastener above the thimble affords free entrance for the plunger 12. When the handles of the tool are pressed toward each other the plunger 12 is forced inwardly, engages the bottom of the thimble 4, and forces the body portion inwardly and partly through the shank 3. During this movement the thimble engages the folded ends 7 of the shank and forces them outwardly, as shown in Fig. 4. thus expanding the inner end portion of the shank and securing the fastener rigidly in the frame 9. A shoulder 13 on the plunger 12 engages the outer end of the head 2 and limits the inward movement of the plunger. During this operation the yielding fingers 8 of the thimble, which originally supplied the thimble in its proper position in the fastener, have been deformed and forced outwardly into contact with the inner walls of the head and they remain in this position after the plunger has been removed. They assist in holding the thimble in the position to which it has been moved by the plunger, which is desirable in order to keep the thimble from vibrating relatively to the shank. This thimble also performs the function of closing the shank and thus preventing wind from whistling through the fastener.

Usually the shank 3 and thimble 4 are made of sheet metal, such as brass, which can readily be deformed and shaped, but which has no substantial degree of resiliency. The head 2, however, is preferably made of thicker metal or stock having greater strength and resistance to distortion, so that it is not likely to become deformed in setting the fasteners.

If the nature of the work is such that a tool similar to that shown in Fig. 4 cannot be used, the fasteners can be set by using a tool having an end portion similar to that of the plunger 12, inserting this tool in the fastener, and striking it lightly with a hammer or mallet. The shoulder formed by the flange 6 of the fastener rests on the other face of the work and effectively supports the fastener during such a setting operation.

The invention thus provides a fastener of simple construction, which can be manufactured economically, and which is particularly useful in those situations where fasteners of the usual types cannot be set due to the fact that access cannot be obtained to the inner end of the fastener.

While a preferred embodiment of the invention has been herein shown and described, it will be understood that the invention may be embodied in other forms without departing from the spirit or scope thereof. It will also be evident that while the invention has been shown as embodied in a fastener stud, it may under some circumstances be applied to the socket members of fasteners, and the term "stud", therefore, is used in the appended claims to include both a stud and a socket member.

Having thus described my invention, what I desire to claim as new is:

1. A fastener of the character described having a shank adapted to be inserted in the article to which it is to be secured, and a movable member wholly within said fastener separate from said shank and held in the fastener, said movable member having a deformable flange cooperating with an integral shoulder in the fastener and said shank and member having parts cooperating upon movement to slide one upon the other and thereby to expand the end portion of the shank laterally, the fastener being open at the outer end of said member whereby a tool may be inserted in said outer end to push said movable member inwardly and deform said flange.

2. A snap fastener member comprising a tubular member having means at one end for cooperative engagement with another snap fastener member, attaching means located at the other end and including a laterally expansible wall, and an axially movable member normally assembled within the tubular member and having a deformable flange and a portion for movement relative to the attaching means to expand the said relatively expansible wall when said flange is deformed.

3. A fastener of the character described comprising a tubular head and shank, said fastener having an internal shoulder, and a thimble provided with deformable yielding fingers resting on said shoulder and having a body portion extending into said shank, said shank having parts cooperating with said thimble to expand the shank laterally when the thimble is pushed inwardly to deform said yielding fingers.

4. A fastener of the character described comprising a tubular head and a tubular split shank, said fastener having an internal shoulder, and a thimble in said fastener provided with deformable yielding fingers resting on said shoulder and having a body portion in said shank, said shank and thimble having parts cooperating to expand the shank laterally when the thimble is pushed inwardly to deform said yielding fingers.

GEORGE A. HOLMES.